United States Patent [19]

Shimomura et al.

[11] 4,050,293
[45] Sept. 27, 1977

[54] DEVICE FOR DETECTING THE UNEVENNESS OF A CURVED SURFACE

[75] Inventors: Raiji Shimomura, Kokubunji; Toru Habu, Hachioji; Hisaaki Itoh, Mie; Naomi Sakai, Kanagawa; Tatsuo Goto, Hamura, all of Japan

[73] Assignees: Hitachi, Ltd.; Hitachi Metals, Ltd., both of Japan

[21] Appl. No.: 633,715

[22] Filed: Nov. 20, 1975

[30] Foreign Application Priority Data

Nov. 27, 1974  Japan .............................. 49-135491

[51] Int. Cl.² .............................................. G01B 5/28
[52] U.S. Cl. ..................................... 73/105; 33/147 L
[58] Field of Search ................. 73/105, 104; 33/147 L, 33/174 Q

[56] References Cited

U.S. PATENT DOCUMENTS

| | | | |
|---|---|---|---|
| 3,056,209 | 10/1962 | Oliver | 73/105 |
| 3,329,011 | 7/1967 | Dereng | 73/105 |
| 3,470,739 | 10/1969 | Takafuji et al. | 73/105 |
| 3,768,307 | 10/1973 | Rode | 73/105 |

Primary Examiner—James J. Gill
Assistant Examiner—Anthony V. Ciarlante
Attorney, Agent, or Firm—Craig & Antonelli

[57] ABSTRACT

In a detecting device of the unevenness of a curved surface of an object, the detecting device is characterized by providing means for seizing or holding the object, means for moving the seizing means in a predetermined direction, a variation detector for detecting the presence of a projection or a recess on the surface of the object, a supporting means including at least two contact members which contact the surface of the object for supporting the variation detector at a position corresponding to the position of the surface, and means for guiding the supporting means in response to the position variation of the surface.

18 Claims, 11 Drawing Figures

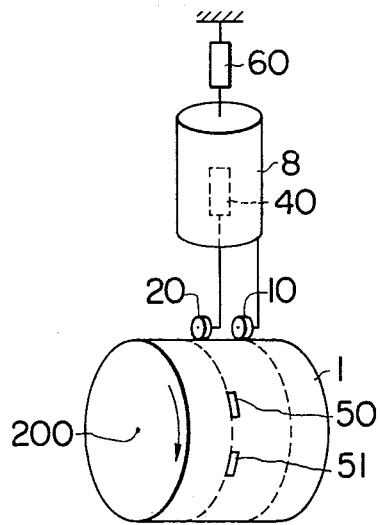
FIG. 1
FIG. 4
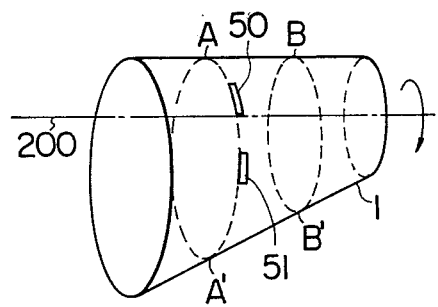
FIG. 2
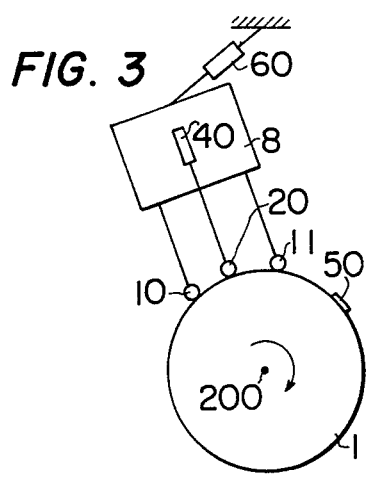
FIG. 3
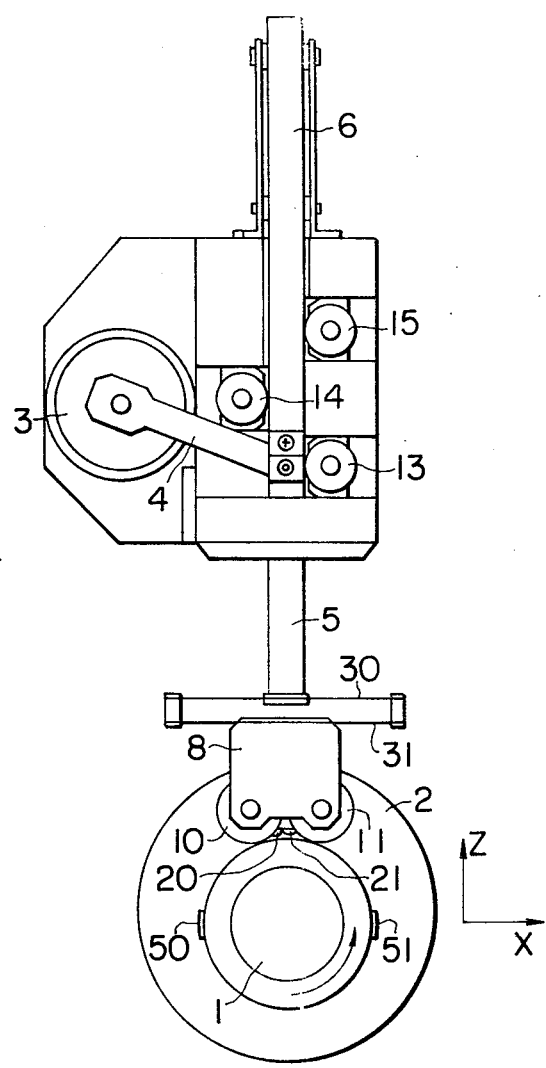

DEVICE FOR DETECTING THE UNEVENNESS OF A CURVED SURFACE

This invention relates to a device for detecting the unevenness or roughness of a curved surface of an object member such as one having a cylindrical surface, a spherical surface, etc.

Conventional devices for detecting the unevenness of a planar surface are well known, particularly optical detectors.

In order to detect the unevenness of a curved surface, the position of the surface with respect to the detector varies, as well as the unevenness or roughness of the surface to be detected, and it is necessary to detect both the variation of position together with the unevenness of the surface. Therefore, complicated operations are required with the conventional device. For example, to detect the unevenness of the circumferential surface of a cylinder of which the circularity is unsatisfactory or deviates, or in which the center or axis of rotation shifts in position, complicated structures and operations are necessary in using the conventional devices.

To solve such problems, a proposal has been made for a detector which includes mechanical contact members. Such a detector is characterized by arranging two contact members on the surface of an object member which rotates around an axis of rotation. One contact member is provided to detect the positional variation of the surface, while the other contact member is provided to detect a recess or a projection of the surface, i.e. the unevenness of the surface. However, such a detector has the following disadvantages.

In using an elliptical cone which is axially asymmetrical as an object member, variations of the contact positions of two contact members are different with respect to each other. Therefore, the unevenness of the object member surface is erroneously detected. That is, it is impossible to detect the unevenness of curved surfaces of particular shapes, such as those being asymmetric with respect to an axis of rotation.

An object of this invention is to provide an unevenness or roughness detecting device which can correctly detect the unevenness of a curved surface of an object member in spite of deviations of the circularity thereof, shifting of the position of the rotation center or axis thereof, variations of the size thereof, etc.

Another object of this invention is to provide an unevenness detecting device which is simple in structure and is inexpensive.

Further, another object of this invention is to provide an unevenness detecting device which can distinguish unnecessary projections, such as working rubbish (small projections formed by working on the object member), from surface projections to be detected.

In order to achieve such objects, this invention is characterized by providing an unevenness or roughness detecting device which comprises means for seizing or holding an object member which has a curved surface, means for moving the seizing means so as to move the curved surface of the object member in a predetermined direction, at least one member for detecting the unevenness of the curved surface, at least two contact members which contact the surface of the object member for holding the detecting member at a predetermined position corresponding to, or relative to, the position of the surface of the object member, and guiding means for inclining the contact and detecting members and moving these members to a direction perpendicular to the moving direction of the surface in order to always contact the contact members with the surface in spite of position variations of the surface.

These and other objects of the present invention may be further appreciated by reference to the drawing figures wherein:

FIG. 1 is a diagram showing a conventional unevenness detecting device;

FIG. 2 is a diagram showing a positional deformation of the object to be measured;

FIG. 3 is a diagram showing a fundamental structure of an unevenness detecting device according to this invention;

FIGS. 4 and 5 are respective front and side views of an embodiment of an unevenness detecting device according to this invention;

Figure 5:
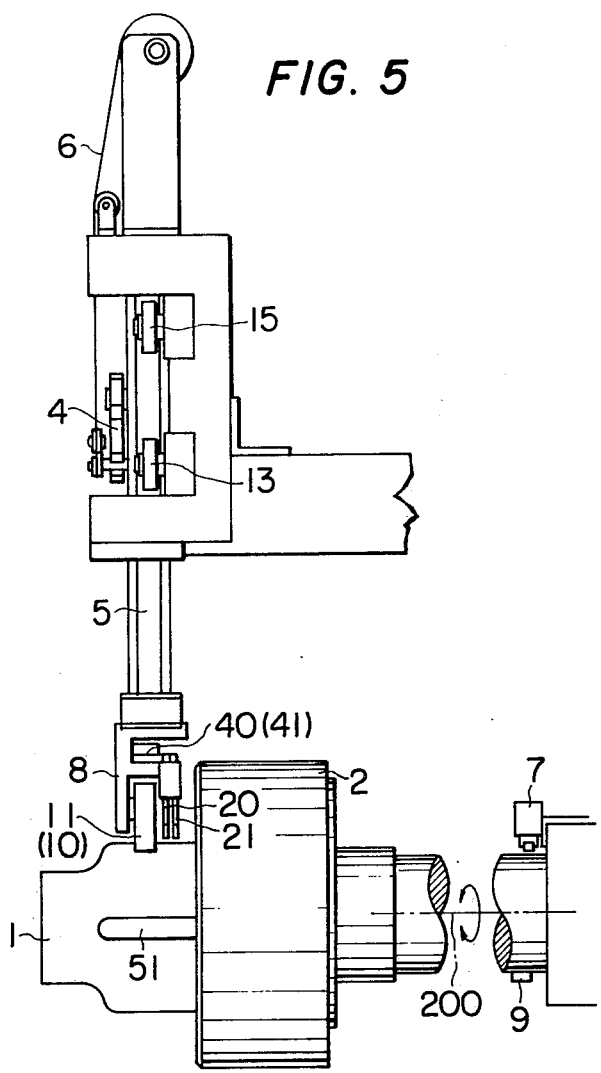

A conventional device for detecting the unevenness of a curved surface of a workpiece, or object to be detected, is shown in FIG. 1 wherein projections 50 and 51 are provided on a curved surface of a cylindrical workpiece 1 which rotates around an axis 200 of rotation. Two contact members 10 and 20 are arranged in an axial direction in contact with the curved surface. One contact member 20 is arranged at a position where the projections pass and the other contact member 10 is arranged at a position where the projections never pass.

A supporting member 8 for supporting a position variation detector 40 is supported on the surface by contact member 10. This detector 40 is moved in a direction perpendicular to the axial direction, together with the supporting member 8, and contact member 20 is connected with the detector 40. Contact of the contact members 10 and 20 with the surface of the workpiece 1 is maintained by an elastic mechanism 60.

By this construction, the relative position variation of contact member 20 to the position variation of contact member 10 is detected by the detector 40. However, such a conventional device has the following disadvantages.

If the workpiece 1 is an elliptical cone asymmetrically rotated about the rotation axis 200, as shown in FIG. 2, a point A is equal to a point B in distance from the axis 200 in the direction perpendicular to the axial direction; but, on the other hand, a point A' is unequal in the distance than a point B'.

Therefore, the unevenness of the work surface is erroneously detected as the workpiece 1 in FIG. 2 is rotated about the axis 200 since the relative positions of the detectors 10 and 20 change as a result of configuration rather than unevenness of the surface. Thus, it is impossible to correctly detect the unevenness of a curved surface of particular shapes, such as a structure of FIG. 2.

FIG. 3 shows a basic structure of an unevenness or roughness detecting device according to this invention. In FIG. 3, a projection 50, representing the unevenness to be detected, is provided on a cylindrical surface of a workpiece 1 which rotates around the rotation axis 200.

Two contact members 10 and 11 are arranged in a circumferential direction with respect to each other; that is, a rotational direction in contact with the surface of the workpiece 1. The supporting member 8 for supporting variation detector 40 is supported on the surface of the workpiece 1 by both contact members 10 and 11 in contact with the surface of the workpiece 1. A detecting member 20 connected with the detector 40 is arranged on the surface of the workpiece 1 so that the detector 40 is arranged between the contact members.

Furthermore, the supporting member 8 is elastically supported by a guiding mechanism 60 which has flexibility so as to both move the detector 40 in a direction perpendicular to the axial direction and to incline the contact members 10 and 11, the detecting member 20 and the detector 40. Therefore, the contact members 10 and 11 always contact the surface of the workpiece 1 and the detecting member 20 tends toward a direction perpendicular to the axial direction.

In such a structure, since the contact members 10 and 11 correctly follow the configuration, or position variation, of the surface by always remaining in contact with the surface, the projection 50 on the surface is detected correctly in spite of the deviation of the circularity, shifting of the axis position, the variation of the work size, etc., because the detecting member 20 is able to move relative to the surface rather than relative to the position of the contact members.

It is also possible to detect a plurality of projections, at least one recess or a combination of at least one projection and at least one recess in the device shown in FIG. 3. Various members can be used for the workpiece 1 which have the respective curved surfaces, such as a glove, a cone, etc. Furthermore, the workpiece 1 is not confined to a rotating member but may be a member which moves in a predetermined direction. The number of the contact members may be more than two and the contact members may be also arranged to an axial direction.

FIGS. 4 and 5 show front and side views of an embodiment of an unevenness detecting device according to this invention.

In these figures, a cylindrical workpiece 1 which has projections 50 and 51 on the surface is seized or held by a seizing device 2, such as a magnet or magnetic chuck, and is rotated around an axis 200. A rotary solenoid 3 is linked through a transfer rod 4 with a vertical sliding rod 5 and moves a supporting member 8 in a vertical direction, that is, in a direction perpendicular to an axial direction. The sliding rod 5 slides by means of guide rollers 13 to 15.

Two contact wheels 10 and 11 for supporting the supporting member 8 at the surface of the workpiece 1 are arranged in a rotation direction in contact with the surface of the workpiece 1. When the workpiece 1 is rotated by rotating the seizing device 2, the wheels 10 and 11 are thrust in a direction X by frictional force and are rotated. Therefore, the wheels cause the workpiece 1 to rotate smoothly.

Figure 6:
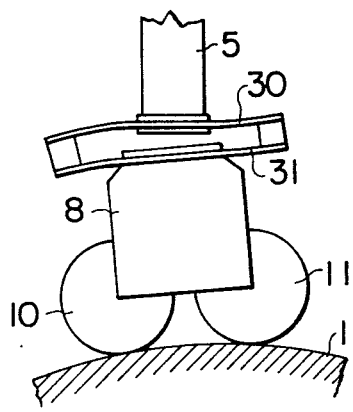
FIG. 6 is a diagram for explaining operations of an elastic mechanism of the unevenness detecting device shown in FIGS. 4 and 5.

The vertical sliding rod 5 is connected through a pair of plate springs 30 and 31 with the supporting member 8 in order to allow position shifting in the X direction. Therefore the wheels 10 and 11 are always contacted with the surface of the workpiece 1 and the supporting member 8 maintains a constant positional relation with the surface of the workpiece 1. That is, as shown in FIG. 6, the supporting member 8 is thrust downwards by the sliding rod 5 and is inclined by the plate springs 30 and 31.

In FIGS. 4 and 5, the sliding rod 5 is supported by a spring 6 providing a constant load. Since the weight of loads such as the supporting member 8, the sliding rod 5, etc. is cancelled by the action of the constant spring 6, the supporting member 8 moves in response to position shifting in a direction Z. Therefore, the accuracy of detection is improved. Furthermore, it is possible to use a low torque rotary solenoid 3 because the load of this rotary solenoid is decreased.

Two detecting members 20 and 21 are disposed between the wheels 10 and 11, and are connected with variation detectors 40 and 41 in order to detect the projections 50 and 51. Operations of the detecting members 20 and 21 are explained with respect to FIGS. 7a through 7d.

Figure 7A:
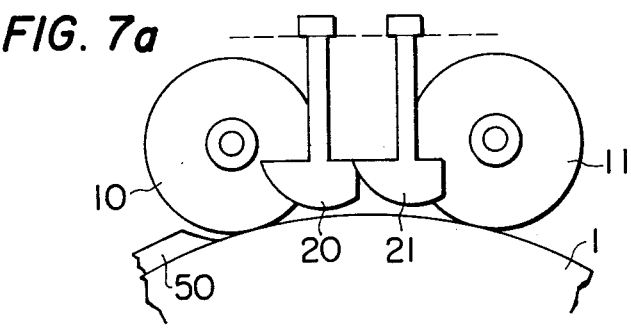
FIGS. 7a to 7d are diagrams explaining operations of the detecting members in the device shown in FIGS. 4 and 5.
Figure 7B:
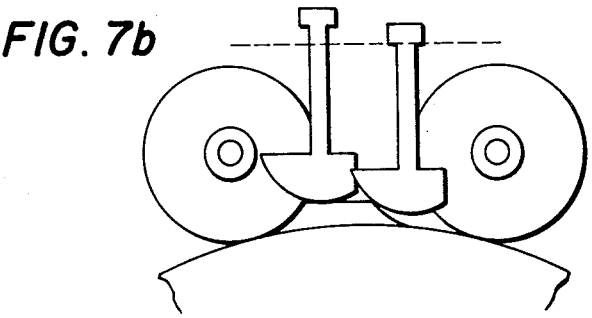
Figure 7C:
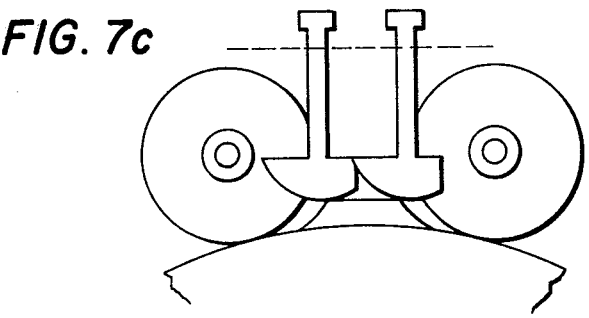
Figure 7D:
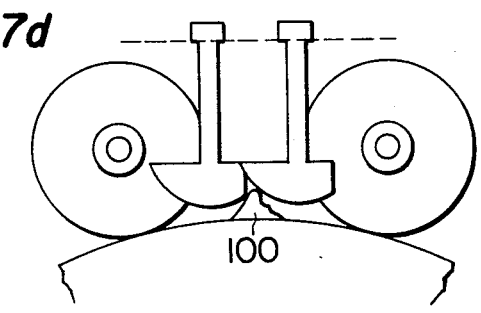

When there is no projection below the detecting members 20 and 21, the bottoms of these members are separated by a predetermined distance from the surface of the workpiece 1 as shown in FIG. 7a. When detecting member 20 contacts a projection 50, this detecting member 20 is thrust upwardly by the projection 50 as shown in FIG. 7b. Furthermore, when both detecting members 20 and 21 contact the projection 50, these members 20 and 21 are thrust upwardly together by the projection 50. The presence of the projection 50 is detected by the detectors 40 and 41 by the thrusting upwardly of both detecting members 20 and 21.

When a small width projection 100, such as occurring by working rubbish formed at the working of the workpiece 1, is below the detecting members 20 and 21, both members 20 and 21 are not moved upwardly at the same time. Therefore, the presence of this projection 100 is not detected.

The detecting members 20 and 21 are generally supported by springs (not shown in the drawing). Furthermore, the bottoms of the detecting members 20 and 21 form a circular arc in shape in order to be smoothly thrust upwardly. It is also possible to provide a roller or a wheel at the bottom of each detecting member.

In order to prevent a driving rod or wire (not shown) of the seizing device 2 from snapping, a detecting tip 9 may be provided on the axis shaft of rotation and a limit switch 7 provided in opposition to the tip 9. Thus, rotation of the seizing device 2 is stopped after only one rotation period by the limit switch 7 even if no projection of the surface is detected.

It is possible to detect at least one recess or a combination of at least one projection and at least one recess by means of modification of this arrangement of the detecting members.

In the embodiment of FIGS. 4 and 5, two detecting members are provided in order to distinguish a small width projection from a projection to be detected. If this small width projection is not present on the surface, a desired projection can be more simply detected by the use of only one detecting member. Furthermore, even if this small width projection is present on the surface, only a projection of a predetermined width may be detected with the single detecting member by measuring the period when this detecting member is thrust upwardly. If a projection has a large width, the detecting member is thrust upwardly during a long period. Therefore, a projection is detected only when the detecting member is thrust upwardly during the predetermined period. Since a projection having a small width only thrusts the detecting member upwardly during a small period, the small width projection can also be detected when the detecting member is thrust upwardly for the small period.

In the above-mentioned embodiment, the position variation of the tops of the members 20 and 21 is detected by the detectors 40 and 41, such as photo-sensors, respectively. If the workpiece 1 and the members 20 and 21 are electrical conductors, a projection may be directly detected without detectors 40 and 41 by detecting the state of conduction between the workpiece 1 and the detecting members 20 and 21. A projection may also be detected without contact by substituting a proximity sensor for the detecting member and the detector.

Figure 8:
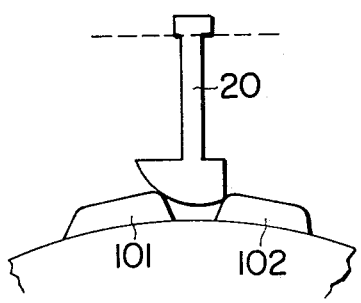
FIG. 8 is a diagram explaining operations of a detecting member of another embodiment of an unevenness detecting device according to this invention.

It is possible to arrange two adjacent projections 101 and 102 on the surface, and detect these projections by means of a detecting member 20 as shown in FIG. 8. That is, when these projections are detected by detecting member 20 within a predetermined period, these projections are regarded as the desired projections.

The above-mentioned device can be used as an object position controller for arranging a plurality of object members in a predetermined direction. Furthermore, the device can be used as a detector for counting the number of projections or recesses.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

We claim:

1. A device for detecting the unevenness of a circumferential surface of a cylindrical-like member comprising:
   means for seizing the cylindrical-like member;
   means for rotating said seizing means such that said cylindrical-like member is rotated about an axis of rotation;
   means for detecting at least one projection or recess on the circumferential surface of said cylindrical-like member;
   supporting means including at least two contact members which contact the circumferential surface of said cylindrical-like member for supporting said detecting means at a position relative to the surface of said cylindrical-like member; and
   means for guiding said supporting means so as to maintain contact of said contact members with the circumferential surface of said cylindrical-like member.

2. A device according to claim 1, wherein said detecting means comprise at least one detecting member being movable in response to the projection or recess and a detector detecting movement of said detecting member from said position relative to the surface of said cylindrical-like member.

3. A device according to claim 1, wherein said detecting means comprise two detecting members, each being movable in response to the projection or recess, and two detectors detecting movement of the respective detecting members from said position relative to the surface of said cylindrical-like member, said detectors indicating the presence of the projection or recess when both detector members are moved from said position.

4. A device according to claim 1, wherein each of said contact members comprise rotating members.

5. A device according to claim 1, wherein said guiding means comprise first means for moving said supporting means in a direction perpendicular to the axial direction of said cylindrical-like member, and second means for inclining said supporting means by a predetermined angle to said cylindrical-like member.

6. A device according to claim 5, wherein said first means comprises a rotary solenoid, a sliding rod and a transfer rod connected with said rotary solenoid and said sliding rod.

7. A device according to claim 8, wherein said second means comprises a pair of plate springs connected to each other.

8. A device according to claim 5, wherein said guiding means further include third means for supporting said first and second means.

9. A device according to claim 8, wherein said third means comprise a constant spring.

10. A device according to claim 8, wherein said first means comprises a rotary solenoid, a sliding rod and a transfer rod connected with said rotary solenoid and said sliding rod; wherein said second means comprise a pair of plate springs connected with said sliding rod and said supporting means; and wherein said third means comprise a constant spring connected with said sliding rod.

11. A device according to claim 1, wherein said rotating means includes a rotation shaft, a detecting member provided on said rotation shaft, and a limit switch provided in opposition to said detecting member for detecting the proximity of said limit switch, thereby stopping rotation of said rotation shaft.

12. A device according to claim 1, wherein said axis of rotation is asymmetrical relative to the longitudinal center axis of said cylindrical-like member.

13. A device according to claim 1, wherein said cylindrical-like member is a right-circular cylinder.

14. A device according to claim 1, wherein said cylindrical-like member is an elliptical cone.

15. A device according to claim 1, wherein said axis of rotation is asymmetrical relative to the longitudinal center axis of said elliptical cone.

16. A device according to claim 1, wherein said contact members are arranged in the direction of rotation of said cylindrical-like member.

17. A device according to claim 16, wherein said detecting means comprise at least one detecting member being movable in response to the projection or recess, said at least one detecting member being arranged between said contact members.

18. A device according to claim 16, wherein said detecting means comprise two detecting members, each being movable in response to the projection or recess, and said two detecting members being arranged between said contact members.

* * * * *